US008858801B2

(12) United States Patent
Domke et al.

(10) Patent No.: US 8,858,801 B2
(45) Date of Patent: Oct. 14, 2014

(54) CU—MO SEPARATION

(75) Inventors: Imme Domke, Mannheim (DE); Alexej Michailovski, Ludwigshafen (DE); Norbert Mronga, Dossenheim (DE)

(73) Assignees: BASF SE, Ludwigshafen (DE); Siemens Aktiengesellschaft, München (DE)

( * ) Notice: Subject to any disclaimer, the term of this patent is extended or adjusted under 35 U.S.C. 154(b) by 647 days.

(21) Appl. No.: 13/203,079

(22) PCT Filed: Feb. 22, 2010

(86) PCT No.: PCT/EP2010/052195
§ 371 (c)(1),
(2), (4) Date: Sep. 21, 2011

(87) PCT Pub. No.: WO2010/097361
PCT Pub. Date: Sep. 2, 2010

(65) Prior Publication Data
US 2012/0000857 A1    Jan. 5, 2012

(30) Foreign Application Priority Data

Feb. 24, 2009  (EP) ..................................... 09153495

(51) Int. Cl.
*B03C 1/015* (2006.01)

(52) U.S. Cl.
CPC ..................................... *B03C 1/015* (2013.01)
USPC ........... 210/695; 210/679; 210/714; 210/724; 210/222; 209/5; 209/8; 209/9; 209/39; 209/214

(58) Field of Classification Search
CPC ...................................................... B03C 1/015
USPC .......... 210/679, 695, 714, 724, 222; 209/5, 8, 209/39, 214
See application file for complete search history.

(56) References Cited

U.S. PATENT DOCUMENTS

| | | |
|---|---|---|
| 4,356,098 A | 10/1982 | Chagnon |
| 4,657,666 A | 4/1987 | Snook et al. |
| 4,834,898 A | 5/1989 | Hwang |
| 4,906,382 A | 3/1990 | Hwang |
| 2010/0200510 A1 | 8/2010 | Domke et al. |
| 2010/0300941 A1 | 12/2010 | Domke et al. |
| 2011/0000826 A1 | 1/2011 | Diez et al. |
| 2011/0120919 A1 | 5/2011 | Domke et al. |
| 2011/0120954 A1 | 5/2011 | Domke et al. |
| 2011/0229384 A1 | 9/2011 | Michailovski et al. |
| 2011/0240527 A1 | 10/2011 | Domke et al. |
| 2011/0272623 A1 | 11/2011 | Domke et al. |
| 2011/0303772 A1 | 12/2011 | Michailovski et al. |
| 2011/0303773 A1 | 12/2011 | Domke et al. |
| 2011/0309003 A1 | 12/2011 | Domke et al. |
| 2012/0058463 A1 | 3/2012 | Deuerlein et al. |

FOREIGN PATENT DOCUMENTS

| | | |
|---|---|---|
| GE | SU452500 | 12/1974 |
| WO | 02 066168 | 8/2002 |
| WO | 2007 008322 | 1/2007 |
| WO | 2009 010422 | 1/2009 |
| WO | WO 2009/030669 A2 | 3/2009 |
| WO | WO 2009/101070 A2 | 8/2009 |

OTHER PUBLICATIONS

International Preliminary Report on Patentability for PCT/EP2010/052195, issued on Aug. 30, 2011.*
International Search Report issued May 26, 2010 in PCT/EP10/052195 filed Feb. 22, 2010.
Gray, S.R., et al., "Recovery of Fine Gold Particles by Flocculation with Hydrophobic Magnetite," Extractive Metallurgy Conference, pp. 223-226, Perth Oct. 2-4, 1991.

* cited by examiner

*Primary Examiner* — David A Reifsnyder
(74) *Attorney, Agent, or Firm* — Oblon, Spivak, McClelland, Maier & Neustadt, L.L.P.

(57) ABSTRACT

The present invention relates to a process for separating at least one first material from a mixture comprising this at least one first material, at least one second material and at least one third material, which comprises at least the following steps:

(A) contacting of the mixture comprising at least one first material, at least one second material and at least one third material with at least one hydrocarbon in an amount of from 0.01 to 0.4% by weight, based on the sum of mixture and at least one hydrocarbon, in the presence or absence of at least one dispersion medium, (B) if appropriate, addition of at least one dispersion medium to the mixture obtained in step (A) in order to obtain a dispersion, (C) treatment of the dispersion from step (A) or (B) with at least one hydrophobic magnetic particle, so that the at least one first material and the at least one magnetic particle agglomerate, (D) separation of the adduct from step (C) from the mixture by application of a magnetic field, (E) if appropriate, dissociation of the adduct which has been separated off in step (D) in order to obtain the at least one first material and the at least one magnetic particle separately.

20 Claims, No Drawings

CU—MO SEPARATION

The present invention relates to a process for separating at least one first material from a mixture comprising this at least one first material, at least one second material and at least one third material, wherein the mixture to be treated is firstly brought into contact with at least one hydrocarbon in an amount of from 0.01 to 0.4% by weight, based on the sum of mixture and at least one hydrocarbon, this mixture is further brought into contact with at least one hydrophobic magnetic particle so that the magnetic particle and the at least one first material agglomerate and this agglomerate is separated from the at least one second material and the at least one third material by application of a magnetic field and, if appropriate, the at least one first material is subsequently separated, preferably quantitatively, from the magnetic particle, with the magnetic particle preferably being able to be recirculated to the process.

In particular, the present invention relates to a process for separating at least one ore from a mixture in the presence of at least one further ore and the gangue. Processes for separating ores from mixtures comprising these are already known from the prior art.

WO 02/0066168 A1 relates to a process for separating ores from mixtures comprising these, in which suspensions or slurries of these mixtures are treated with particles which are magnetic and/or able to float in aqueous solutions. After addition of the magnetic and/or floatable particles, a magnetic field is applied so that the agglomerates are separated off from the mixture. However, the degree of binding of the magnetic particles to the ores and the strength of the bond is not sufficient to carry out the process with sufficiently high yield and effectiveness.

U.S. Pat. No. 4,657,666 discloses a process for the enrichment of ores, wherein the ore present in the gangue is reacted with magnetic particles, as a result of which agglomerates are formed due to hydrophobic interactions. The magnetic particles are hydrophobicized on the surface by treatment with hydrophobic compounds, so that binding to the ore occurs. The agglomerates are then separated from the mixture by means of a magnetic field. Said document also discloses that the ores are treated with a surface-activating solution of 1% of sodium ethylxanthogenate before the magnetic particle is added. Ore and magnetic particle are separated in this process by destruction of the surface-activating substance which has been applied in the form of the surface-activating solution to the ore.

U.S. Pat. No. 4,834,898 discloses a process for separating off nonmagnetic materials by bringing them into contact with magnetic reagents which are enveloped by two layers of surface-active substances. U.S. Pat. No. 4,834,898 further discloses that the surface charge of the nonmagnetic particles which are to be separated off can be influenced by various types and concentrations of electrolyte reagents. For example, the surface charge is altered by addition of multivalent anions, for example tripolyphosphate ions.

S. R. Gray, D. Landberg, N. B. Gray, Extractive Metallurgy Conference, Perth, 2-4 Oct. 1991, pages 223-226 discloses a process for recovering small gold particles by bringing the particles into contact with magnetite. Before contacting, the gold particles are treated with potassium amylxanthogenate. A process for separating the gold particles from at least one hydrophilic material is not disclosed in this document.

WO 2007/008322 A1 discloses a magnetic particle which is hydrophobicized on the surface for the separation of impurities from mineral substances by magnetic separation processes. According to WO 2007/008322 A1, a dispersant selected from among sodium silicate, sodium polyacrylate or sodium hexametaphosphate can be added to the solution or dispersion.

It is an object of the present invention to provide a process by means of which at least one first material can be separated efficiently from mixtures comprising at least one first material, at least one second material and at least one third material, where the at least one first material and the at least one second material have an identical or similar character. For example, the at least one first material and the at least one second material can be ionic compounds having the same anion but different cations, for example two sulfides of different transition metal cations. Furthermore, it is an object of the present invention to treat the at least one first material to be separated off in such a way that the adduct of magnetic particle and first material is sufficiently stable to ensure a high yield of the first material in the separation without a large amount of second material being separated off at the same time.

These objects are achieved by a process for separating at least one first material from a mixture comprising this at least one first material, at least one second material and at least one third material, which comprises at least the following steps:

(A) contacting of the mixture comprising at least one first material, at least one second material and at least one third material with at least one hydrocarbon in an amount of from 0.01 to 0.4% by weight, based on the sum of mixture and at least one hydrocarbon, in the presence or absence of at least one dispersion medium, (B) if appropriate, addition of at least one dispersion medium to the mixture obtained in step (A) in order to obtain a dispersion, (C) treatment of the dispersion from step (A) or (B) with at least one hydrophobic magnetic particle, so that the at least one first material and the at least one magnetic particle agglomerate, (D) separation of the adduct from step (C) from the mixture by application of a magnetic field, (E) if appropriate, dissociation of the adduct which has been separated off in step (D) in order to obtain the at least one first material and the at least one magnetic particle separately.

The process of the invention is preferably employed for separating at least one first, hydrophobic or hydrophobicized material from a mixture comprising this at least one first, hydrophobic or hydrophobicized material, at least one second, hydrophobic or hydrophobicized material and at least one third, hydrophilic material, where the at least one first material and the at least one second material have a different hydrophobicity or are hydrophobicized to different extents.

For the purposes of the present invention, materials are referred to as "hydrophobic" when their surface forms a contact angle against water of more than 90°. The larger the contact angle formed, the more hydrophobic the material. For the purposes of the present invention, materials are referred to as "hydrophilic" when their surface forms a contact angle against water of less than 90°. The smaller the contact angle formed, the more hydrophilic the material. In a preferred embodiment, the at least one first material has a greater hydrophobicity than the at least one second material. According to the invention, the at least one first material and, if appropriate, the at least one second material can, if appropriate, be hydrophobicized by addition of a hydrophobicizing agent in order to have a hydrophobicity suitable for the process of the invention.

In a preferred embodiment of the process of the invention, the at least one first material and the at least one second material are hydrophobic or hydrophobicized metal compounds or coal and the at least one third material is a hydrophilic metal compound.

Thus, the at least one first material to be separated off and the at least one second material are preferably metal compounds selected from the group consisting of sulfidic ores, oxidic and/or carbonate-containing ores, for example azurite $[Cu_3(CO_3)_2(OH)_2]$ or malachite $[Cu_2[(OH)_2|CO_3]]$), and the noble metals, where the at least one first material is preferably more hydrophobic than the at least one second material.

The at least one third material which is present in the mixture to be treated according to the invention is preferably a hydrophilic metal compound selected from the group consisting of oxidic and hydroxidic metal compounds, for example silicon dioxide $SiO_2$, silicates, aluminosilicates, for example feldspars, for example albite $Na(Si_3Al)O_8$, mica, for example muscovite $KAl_2[(OH,F)_2AlSi_3O_{10}]$, garnets (Mg, Ca, $Fe^{II}$)$_3$(Al, $Fe^{III}$)$_2$(SiO$_4$)$_3$, $Al_2O_3$, FeO(OH), $FeCO_3$, $Fe_2O_3$, $Fe_3O_4$ and further related minerals and mixtures thereof.

Examples of sulfidic ores which can be used according to the invention are, for example, selected from the group of copper ores consisting of covellite CuS, molybdenum(IV) sulfide, chalcopyrite (copper pyrite) $CuFeS_2$, bornite $Cu_5FeS_4$, chalcocite (copper glance) $Cu_2S$, pentlandite (Ni, Fe)S, pyrrhotite $Fe_{1-x}S$, pyrite $FeS_2$ and mixtures thereof.

Accordingly, preference is given to using untreated ore mixtures which can be obtained from mines in the process of the invention.

Very particularly preferred first materials are selected from the group consisting of molybdenum(IV) sulfide, pyrrhotite $Fe_{1-x}S$, chalcopyrite (copper pyrite) $CuFeS_2$, bornite $Cu_5FeS_4$ and mixtures thereof. Further examples of the at least one first material which is separated off by means of the process of the invention are noble metals, for example Au, Pt, Pd, Rh, etc., preferably in the native state.

Very particularly preferred second materials are selected from the group consisting of copper sulfides, for example chalcopyrite (copper pyrite) $CuFeS_2$, covellite CuS, $Cu_2S$, Pyrite $FeS_2$ and mixtures thereof.

Depending on the conditions set (pH, redox potential of the suspension, etc.), CuS, $Cu_2S$, ZnS, PbS, bornite $Cu_5FeS_4$ can be counted as either first materials or second materials. This is known to those skilled in the art.

The present invention also provides a process according to the invention in which the at least one first material is a sulfidic molybdenum ore and the at least one second material is a sulfidic copper ore.

The present invention further provides a process according to the invention in which the at least one first material is chalcopyrite (copper pyrite) $CuFeS_2$ and the at least one second material is ZnS.

The present invention further provides a process according to the invention in which the at least one first material is $Cu_2S$ and the at least one second material is pyrite $FeS_2$.

The present invention also provides a process according to the invention in which the at least one third material is selected from the group consisting of oxidic and hydroxidic metal compounds.

Very particularly preferred third materials are selected from among silicon dioxide $SiO_2$, feldspar (Ba,Ca,Na,K,NH$_4$)(Al,B,Si)$_4$O$_8$, limestone $CaCO_3$, dolomite (Ca,Mg)$CO_3$, mica $KAl_2[AlSi_3O_{10}(OH)_2]$, olivine (Mg,Mn,Fe)$_2$[SiO$_4$], clay minerals and mixtures thereof.

In addition to the compounds mentioned, sulfides of metals other than copper, for example sulfides of iron, lead, zinc or molybdenum, i.e. FeS/FeS$_2$, PbS, ZnS, can also be present in the mixtures. Furthermore, oxidic compounds of metals and semimetals, for example silicates or borates, or other salts of metals and semimetals, for example phosphates, sulfates or oxides/hydroxides/carbonates and further salts, for example azurite $[Cu_3(CO_3)_2(OH)_2]$, malachite $[Cu_2[(OH)_2(CO_3)]]$, barite (BaSO$_4$), monazite ((La—Lu)PO$_4$) can be present in the ore mixtures to be treated according to the invention.

Thus, a particularly preferred mixture which is treated in the process of the invention comprises molybdenum(IV) sulfide, chalcopyrite (copper pyrite) $CuFeS_2$ or $Cu_2S$ as first material, copper sulfide, for example CuS and/or $Cu_2S$, ZnS or pyrite $FeS_2$ as second material and silicon dioxide $SiO_2$ and possibly further oxides and/or hydroxides as third material.

In the mixture to be treated according to the invention, the at least one first material is generally present in an amount of from 0.001 to 5.0% by weight, preferably from 0.01 to 1% by weight, particularly preferably from 0.01 to 0.1% by weight, in each case calculated as metal and based on the total mixture.

In the mixture to be treated according to the invention, the at least one second material is generally present in an amount of from 0.1 to 5.0% by weight, preferably from 0.5 to 4.0% by weight, in each case calculated as metal and based on the total mixture.

In the mixture to be treated according to the invention, the at least one third material is generally present in such an amount that the sum of the at least one first material, the at least one second material and the at least one third material is 100% by weight. Thus, the at least one third material is for example present in an amount of from 90.0 to 99.9% by weight, in each case based on the total mixture.

In a preferred embodiment of the process of the invention, the mixture comprising at least one first material, at least one second material and at least one third material is present in step (A) in the form of particles having a size of from 100 nm to 100 μm, for example <125 μm, see, for example, U.S. Pat. No. 5,051,199. In a preferred embodiment, this particle size is obtained by milling. Suitable processes and apparatuses are known to those skilled in the art, for example wet milling in a ball mill.

In a preferred embodiment of the process of the invention, the mixture comprising at least one first material and at least one second material is therefore milled to particles having a size of from 100 nm to 100 μm, for example <125 μm, before or during step (A).

An ore mixture which is typically used for separation by means of the process of the invention has the following composition: about 30% by weight of $SiO_2$, about 30% by weight of feldspar, about 2% of $FeCuS_2$, about 0.5% of $Cu_5FeS_4$, about 0.04% by weight of $MoS_2$, balance chromium, iron, titanium, manganese and magnesium oxides.

The individual steps of the process of the invention are described in detail below:

Step (A):

Step (A) of the process of the invention comprises contacting of the mixture comprising at least one first material, at least one second material and at least one third material with at least one hydrocarbon in an amount of from 0.01 to 0.4% by weight, based on the sum of mixture and at least one hydrocarbon, in the presence or absence of at least one dispersion medium.

Suitable and preferred first, second and third materials have been mentioned above.

For the purposes of the present invention, a hydrocarbon is an organic chemical compound which is made up essentially of carbon, hydrogen and possibly oxygen. If oxygen is present in addition to carbon and hydrogen in the hydrocarbons which can be used according to the invention, it is present, for example, in the form of ester, carboxyl and/or ether groups. Either an essentially uniform hydrocarbon or a hydrocarbon mixture can be used in step (A) of the process of the invention.

Hydrocarbons or hydrocarbon mixtures which can be used according to the invention generally have a low viscosity under the conditions of the process of the invention, so that they are liquid and mobile under the process conditions according to the invention. Preference is given to using hydrocarbons or hydrocarbon mixtures which have a viscosity of from 0.1 to 100 cP, preferably from 0.5 to 5 cP, in each case at 20° C.

Hydrocarbons or hydrocarbon mixtures which can be used according to the invention generally have a flash point of ≥20° C., preferably ≥40° C. The present invention therefore also provides the process according to the invention in which the at least one hydrocarbon has a flash point of ≥20° C., particularly preferably ≥40° C.

In a preferred embodiment of the process of the invention, the at least one hydrocarbon is selected from the group consisting of mineral oils, vegetable oils, biodiesel, BtL (Biomass-to-Liquid) fuels, products of coal liquefaction, products of the GtL (Gas to Liquid, from natural gas) process and mixtures thereof.

Mineral oils are, for example, crude oil derivatives and/or oils produced from brown coal, hard coal, peat, wood, petroleum and, if appropriate, other mineral raw materials by distillation. Mineral oils generally comprise hydrocarbon mixtures of paraffinic hydrocarbons, i.e. saturated chain-like hydrocarbons, naphthenic hydrocarbons, i.e. saturated cyclic hydrocarbons, and aromatic hydrocarbons.

A particularly preferred crude oil derivative is diesel or gas oil. Diesel generally has a composition known to those skilled in the art. Diesel is based essentially on mineral oil, i.e. diesel is a fraction in the fractionation of mineral oil by distillation. The main constituents of diesel are predominantly alkanes, cycloalkanes and aromatic hydrocarbons having from about 9 to 22 carbon atoms per molecule and a boiling range from 170° C. to 390° C.

Further names for suitable petroleum derivatives comprise: light gas oil (boiling point 235-300° C., also referred to, depending on the specification, as "diesel", "diesel fuel", "DF", "light heating oil", "LHO"), heavy gas oil (boiling point 300-375° C.) and also (in the USA) "No. 2 fuel".

Vegetable oils are generally fats and fatty oils which are obtained from oil plants. Vegetable oils comprise, for example, triglycerides. Vegetable oils which are suitable for the purposes of the invention are, for example, selected from the group consisting of sunflower oil, rapeseed oil, safflower oil, soybean oil, corn oil, peanut oil, olive oil, herring oil, cotton seed oil, palm oil and mixtures thereof.

Biodiesel generally has a composition known to those skilled in the art. Biodiesel comprises essentially methyl esters of saturated $C_{16}$-$C_{18}$-fatty acids and unsaturated $C_{18}$-fatty acids, in particular the methyl ester of rapeseed oil.

Products of coal liquefaction can, for example, be obtained by the Fischer-Tropsch or Sasol process. The BtL and GtL processes are known to those skilled in the art.

In a preferred embodiment of the process of the invention, diesel, kerosene and/or light gas oil is used as hydrocarbon in step (A). On a laboratory scale, diesel of the brands Solvesso® and/or Shellsol® can advantageously be used.

In step (A) of the process of the invention, at least one hydrophobicizing agent may, if appropriate, be additionally added. For the purposes of the present invention, a "hydrophobicizing agent" is a substance which is able to increase the hydrophobicity of the surface of the at least one first material in the presence of the other particles which are not to be separated off. Hydrophobicizing agents which can be used according to the invention become attached to the at least one first material and thereby produce a suitable hydrophobicity of the first material.

The present application therefore provides, in a preferred embodiment, the process of the invention in which a hydrophobicizing agent is added in step (A).

In a preferred embodiment, a hydrophobicizing agent of the general formula (I)

$$A\text{-}Z \qquad (I)$$

which binds to the at least one first material, where

A is selected from among linear or branched $C_3$-$C_{30}$-alkyl, $C_3$-$C_{30}$-heteroalkyl, optionally substituted $C_6$-$C_{30}$-aryl, optionally substituted $C_6$-$C_{30}$-heteroalkyl, $C_6$-$C_{30}$-aralkyl and Z is a group by means of which the compound of the general formula (I) binds to the at least one hydrophobic material, is added in step (A) of the process of the invention.

In a particularly preferred embodiment, A is a linear or branched $C_4$-$C_{12}$-alkyl, very particularly preferably a linear $C_4$-$C_8$-alkyl. Heteroatoms which may be present according to the invention are selected from among N, O, P, S and halogens such as F, Cl, Br and I.

In a further preferred embodiment, A is preferably a linear or branched, preferably linear, $C_6$-$C_{20}$-alkyl. Preference is also given to A being a branched $C_6$-$C_{14}$-alkyl in which the at least one substituent, preferably having from 1 to 6 carbon atoms, is preferably present in the 2 position, for example 2-ethylhexyl and/or 2-propylheptyl.

In a further particularly preferred embodiment, Z is selected from the group consisting of anionic groups —(X)$_n$—PO$_3^{2-}$, —(X)$_n$—PO$_2$S$^{2-}$, —(X)$_n$—POS$_2^{2-}$, —(X)$_n$—PS$_3^{2-}$, —(X)$_n$—PS$_2^-$, —(X)$_n$—PO$_2^-$, —(X)$_n$—PO$_3^{2-}$, —(X)$_n$—CO$_2^-$, —(X)$_n$—CS$_2$, —(X)$_n$—COS$^-$, —(X)$_n$—C(S)NHOH, —(X)$_n$—S$^-$, where X is selected from the group consisting of O, S, NH, CH$_2$ and n=0, 1 or 2, with, if appropriate, cations selected from the group consisting of hydrogen, NR$_4^+$ where the radicals R are each, independently of one another, hydrogen or $C_1$-$C_8$-alkyl, alkali or alkaline earth metals. The anions mentioned and the corresponding cations form, according to the invention, uncharged compounds of the general formula (I).

If n=2 in the formulae mentioned, two identical or different, preferably identical, groups A are bound to a group Z.

In a particularly preferred embodiment, use is made of compounds selected from the group consisting of xanthates A—O—CS$_2^-$, dialkyldithiophosphates (A—O)$_2$—PS$_2^-$, dialkyldithiophosphinates (A)$_2$-PS$_2^-$ and mixtures thereof, where the radicals A are each, independently of one another, a linear or branched, preferably linear, $C_6$-$C_{20}$-alkyl, for example n-octyl, or a branched $C_6$-$C_{14}$-alkyl, with the branch preferably being in the 2 position, for example 2-ethylhexyl and/or 2-propylheptyl. In these compounds, counterions present are preferably cations selected from the group consisting of hydrogen, NR$_4^+$ where the radicals R are each, independently of one another, hydrogen or $C_1$-$C_8$-alkyl, alkali or alkaline earth metals, in particular sodium or potassium.

Very particularly preferred compounds of the general formula (I) are selected from the group consisting of sodium or potassium n-octylxanthate, sodium or potassium butylxanthate, sodium or potassium di-n-octyldithiophosphinate, sodium or potassium di-n-octyldithiophosphate, and mixtures of these compounds.

In the case of noble metals, for example Au, Pd, Rh, etc., particularly preferred surface-active substances are monothiols, dithiols and trithiols or 8-hydroxyquinolines, for example as described in EP 1200408 B1.

In the case of metal oxides, for example FeO(OH), $Fe_3O_4$, ZnO, etc., carbonates, for example azurite $[Cu(CO_3)_2(OH)_2]$, malachite $[Cu_2[(OH)_2CO_3]]$, particularly preferred hydrophobicizing agents are octylphosphonic acid (OPA), $(EtO)_3Si$-A, $(MeO)_3Si$-A, where A has the abovementioned meanings. In a preferred embodiment of the process of the invention, no hydroxylates are used as hydrophobicizing agent for modifying metal oxides.

In the case of metal sulfides, for example $Cu_2S$, $MoS_2$, etc., particularly preferred hydrophobicizing agents are monothiols, dithiols and trithiols or xanthogenates.

In a further preferred embodiment of the process of the invention, Z is —$(X)_n$—$CS_2^-$, —$(X)_n$—$PO_2^-$ or —$(X)_n$—$S^-$ where X is O and n is 0 or 1 and a cation selected from among hydrogen, sodium or potassium. Very particularly preferred hydrophobicizing agents are 1-octanethiol, potassium n-octylxanthate, potassium butylxanthate, octylphosphonic acid and di(n-octyl)thionocarbamate (a compound of the formula (II))

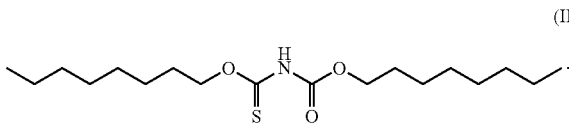

(II)

The addition of at least one abovementioned hydrophobicizing agent in step (A) of the process of the invention is preferably carried out when the hydrophobicity of the at least one first material is not sufficiently high, particularly preferably when the at least one first material is selected from among $FeCuS_2$ or $CuS_2$.

The contacting of the mixture of the at least one hydrocarbon and, if appropriate, the at least one hydrophobicizing agent in step (A) of the process of the invention can occur by all methods known to those skilled in the art. Step (A) can be carried out in bulk or in dispersion, preferably in suspension, particularly preferably in aqueous suspension.

In an embodiment of the process of the invention, step (A) is carried out in bulk, i.e. in the absence of a dispersion medium.

For example, the mixture to be treated and the at least one hydrocarbon or hydrocarbon mixture and, if appropriate, at least one hydrophobicizing agent are combined and mixed in the appropriate amounts without a further dispersion medium. Suitable mixing apparatuses are known to those skilled in the art, for example mills such as a ball mill.

In a further preferred embodiment, step (A) is carried out in a dispersion, preferably in suspension. As dispersion media, it is possible to use all dispersion media in which the mixture in step (A) is not completely soluble. Suitable dispersion media for preparing the slurry or dispersion in step (A) of the process of the invention are selected from the group consisting of water, water-soluble organic compounds, for example alcohols having from 1 to 4 carbon atoms, and mixtures thereof.

In a particularly preferred embodiment, the dispersion medium in step (A) is water.

The solids content of the dispersion obtained in step (A) is generally from 40 to 80% by weight, preferably from 50 to 70% by weight, in each case based on the total mixture.

Step (A) of the process of the invention is generally carried out at a temperature of from 1 to 80° C., preferably from 20 to 40° C., particularly preferably at ambient temperature.

Step (B):

The optional step (B) of the process of the invention comprises addition of at least one dispersion medium to the mixture obtained in step (A) in order to obtain a dispersion.

The mixture obtained in step (A) comprises, in one embodiment when step (A) is carried out in bulk, at least one first material, at least one second material and at least one third material and also at least one hydrocarbon and, if appropriate, at least one hydrophobicizing agent. If step (A) is carried out in bulk, step (B) of the process of the invention is carried out, i.e. at least one suitable dispersion medium is added to the mixture obtained in step (A) in order to obtain a dispersion.

In the embodiment in which step (A) of the process of the invention is carried out in dispersion, it is not absolutely necessary to carry out step (B). However, even in this embodiment, preference is given to carrying out step (B), i.e. further dispersion medium is added in order to obtain, in step (B), a dispersion which has a lower solids content than the dispersion in step (A).

Suitable dispersion media are all dispersion media which have already been mentioned in respect of step (A). In a particularly preferred embodiment, the dispersion medium in step (B) is water.

Thus, in step (B), either the mixture present in bulk from step (A) is converted into a dispersion or the mixture which is already present in dispersion from step (A) is converted into a dispersion having a lower solids content by addition of dispersion medium.

In general, the amount of dispersion medium added in step (A) and/or step (B) can, according to the invention, be selected so that a dispersion which is readily stirrable and/or flowable is obtained. In a preferred embodiment, the solids content of the dispersion obtained in step (B) of the process of the invention is from 0.5 to 30% by weight, preferably from 1.0 to 15% by weight, particularly preferably from 2.0 to 10% by weight, in each case based on the total dispersion.

In a preferred embodiment of the process of the invention, step (B) is carried out since an aqueous dispersion having a high solids content, as indicated above, is preferably produced in step (A) and this is preferably converted in step (B) into a dispersion which has a lower solids content, as indicated above, in order to be used in step (C) of the process of the invention.

The addition of dispersion medium in step (B) of the process of the invention can, according to the invention, be carried out by all methods known to those skilled in the art.

Step (C):

Step (C) of the process of the invention comprises treatment of the dispersion from step (A) or (B) with at least one hydrophobic magnetic particle so that the at least one first material and the at least one magnetic particle agglomerate.

In step (C) of the process of the invention, it is possible to use all magnetic substances and materials known to those skilled in the art. In a preferred embodiment, the at least one magnetic particle is selected from the group consisting of magnetic metals, for example iron, cobalt, nickel and mixtures thereof, ferromagnetic alloys of magnetic metals, for example NdFeB, SmCo and mixtures thereof, magnetic iron oxides, for example magnetite, maghemite, cubic ferrites of the general formula (III)

  (III)

where
M is selected from among Co, Ni, Mn, Zn and mixtures thereof and x is ≤1,
hexagonal ferrites, for example barium or strontium ferrite $MFe_6O_{19}$ where M=Ca, Sr, Ba, and mixtures thereof. The magnetic particles can additionally have an outer layer, for example of $SiO_2$.

In a particularly preferred embodiment of the present patent application, the at least one magnetic particle is magnetite or cobalt ferrite $Co^{2+}_xFe^{2+}_{1-x}Fe^{3+}_2O_4$ where x≤1.

In a further preferred embodiment, the at least one magnetic particle is hydrophobicized on the surface by means of at least one hydrophobic compound. The hydrophobic compound is preferably selected from among compounds of the general formula (IV)

  (IV), where
B is selected from among linear or branched $C_3$-$C_{30}$-alkyl, $C_3$-$C_{30}$-heteroalkyl, optionally substituted $C_6$-$C_{30}$-aryl, optionally substituted $C_6$-$C_{30}$-heteroalkyl, $C_6$-$C_{30}$-aralkyl and
Y is a group by means of which the compound of the general formula (III) binds to the at least one magnetic particle.

In a particularly preferred embodiment, B is a linear or branched $C_6$-$C_{18}$-alkyl, preferably a linear $C_8$-$C_{12}$-alkyl, very particularly preferably a linear $C_{12}$-alkyl. Any heteroatoms present according to the invention are selected from among N, O, P, S and halogens such as F, Cl, Br and I.

In a further particularly preferred embodiment, Y is selected from the group consisting of —$(X)_n$—$SiHal_3$, —$(X)_n$—$SiHHal_2$, —$(X)_n$—$SiH_2Hal$ where Hal is F, Cl, Br, I, and anionic groups such as —$(X)_n$—$SiO_3^{3-}$, —$(X)_n$—$CO_2^-$, —$(X)_n$—$PO_3^{2-}$, —$(X)_n$—$PO_2S^{2-}$, —$(X)_n$—$POS_2^{2-}$, —$(X)_n$—$PS_3^{2-}$, —$(X)_n$—$PS_2^-$, —$(X)_n$—$POS^-$, —$(X)_n$—$PO_2^-$, —$(X)_n$—$CO_2^-$, —$(X)_n$—$CS_2^-$, —$(X)_n$—$COS^-$, —$(X)_n$—$C(S)NHOH$, —$(X)_n$—$S^-$ where X=O, S, NH, $CH_2$ and n=0, 1 or 2, and, if appropriate cations selected from the group consisting of hydrogen, $NR_4^+$ where the radicals R are each, independently of one another, hydrogen or $C_1$-$C_8$-alkyl, an alkali metal, an alkaline earth metal or zinc, or else —$(X)_n$—$Si(OZ)_3$ where n=0, 1 or 2 and Z=a charge, hydrogen or a short-chain alkyl radical.

Very particularly preferred hydrophobicizing substances of the general formula (IV) are dodecyltrichlorosilane, octylphosphonic acid, lauric acid, oleic acid, stearic acid, alkyl esters of phosphoric acid in which the alkyl radicals are each, independently of one another, a linear or branched, preferably linear, $C_6$-$C_{20}$-alkyl, for example n-octyl, or a branched $C_6$-$C_{14}$-alkyl, with the branch preferably being present in the 2 position, for example 2-ethylhexyl and/or 2-propylheptyl, or mixtures thereof.

The treatment of the solution or dispersion with at least one hydrophobic magnetic particle in step (C) of the process of the invention can be effected by all methods known to those skilled in the art.

In a preferred embodiment, the at least one magnetic particle is dispersed in a suitable dispersion medium.

Suitable dispersion media are all dispersion media in which the at least one magnetic particle is not completely soluble. Suitable dispersion media for effecting dispersion in step (C) of the process of the invention are selected from the group consisting of water, water-soluble organic compounds, for example alcohols having from 1 to 4 carbon atoms, for example methanol, ethanol, n-propanol, isopropanol, and mixtures thereof, in particular water and/or isopropanol.

In general, the amount of dispersion medium for predispersion of the magnetic particles can, according to the invention, be selected so that a slurry or dispersion which is readily stirrable and/or flowable is obtained. In a preferred embodiment, the amount of mixture to be treated based on the total slurry or dispersion is up to 60% by weight.

The dispersion of the magnetic particles can, according to the invention, be produced by all methods known to those skilled in the art. In a preferred embodiment, the magnetic particles to be dispersed and the appropriate amount of dispersion medium or mixture of dispersion media are combined in a suitable reactor, for example a glass reactor, and stirred by means of apparatuses known to those skilled in the art, for example in a glass tank by means of a mechanically driven propeller stirrer, for example at a temperature of from 1 to 80° C., preferably at ambient temperature.

In step (C) of the process of the invention, the at least one hydrophobic magnetic particle is generally used in an amount which is sufficient to separate virtually all of the at least one first material from the mixture to be treated. The at least one magnetic particle is preferably used in an at least 10-fold, particularly preferably at least 50-fold, very particularly preferably at least 140-fold, weight excess, based on the amount of the at least one first material in the mixture to be treated, in step (C) of the process of the invention.

The treatment of the dispersion from step (B) with at least one hydrophobic magnetic particle is generally effected by combining the two components by methods known to those skilled in the art. In a preferred embodiment, a dispersion of the at least one magnetic particle is added to the mixture which has been treated beforehand with at least one hydrocarbon. In a further embodiment, the magnetic particle can be added in solid form to a dispersion of the mixture to be treated. In a further preferred embodiment, the two components are present in dispersed form.

Step (C) is generally carried out at a temperature of from 1 to 80° C., preferably from 10 to 30° C., for example ambient temperature.

In step (C), the at least one magnetic particle becomes attached to the at least one first material of the mixture to be treated. The bond between the two components is based on hydrophobic interactions. In a preferred embodiment, little if any hydrophobic interaction occurs between the at least one magnetic particle and the at least one second material. In general, there is no bonding interaction between the at least one magnetic particle and the at least one third material, i.e. the hydrophilic component of the mixture, so that no agglomeration between these components occurs. After step (C), adducts of the at least one first material and the at least one magnetic particle are therefore present in addition to the at least one second material and the at least one third material in the mixture. The process of the invention thus makes it possible to separate off one material selectively from a mixture comprising at least three materials, where at least two of the three materials have a very similar chemical character in respect of hydrophobicity or affinity to the hydrophobicizing agent, the anion present, etc.

Step (D):
Step (D) of the process of the invention comprises separation of the adduct from step (C) from the mixture by application of a magnetic filed.

Step (D) can, in a preferred embodiment, be carried out by introducing a permanent magnet into the reactor in which the mixture from step (C) is present. In a preferred embodiment, a dividing wall made of nonmagnetic material, for example the glass wall of the reactor, is present between permanent magnet and the mixture to be treated. In a further preferred embodiment of the process of the invention, an electromagnet which is only magnetic when an electric current flows is used in step (D). Suitable apparatuses are known to those skilled in the art.

Step (D) of the process of the invention can be carried out at any suitable temperature, for example from 10 to 60° C.

During step (D), the mixture is preferably stirred continually by means of a suitable stirrer.

In step (D), the adduct from step (C) can, if appropriate, be separated off by all methods known to those skilled in the art, for example by draining off the liquid together with the component of the dispersion which is not held by the magnet from the reactor used for step (D) through the bottom valve or pumping away the components of the dispersion which are not held by the at least one magnet through a hose.

Step (E):

The optional step (E) of the process of the invention comprises dissociation of the adducts separated off in step (D) in order to obtain the at least one first material and the at least one magnetic particle separately. In a preferred embodiment of the process of the invention, the dissociation in step (E) is carried out nondestructively, i.e. the individual components present in the dispersion are not altered chemically.

The dissociation can be carried out by all methods known to those skilled in art which are suitable for dissociating the adduct in such a way that the at least one magnetic particle can be recovered in reusable form. In a preferred embodiment, the magnetic particle which has been split off is reused in step (C).

In a preferred embodiment, the dissociation in step (C) of the process of the invention is effected by treating the adduct with a substance selected from the group consisting of organic solvents, basic compounds, acidic compounds, oxidants, reducing agents, surface-active compounds and mixtures thereof.

Examples of suitable organic solvents are methanol, ethanol, propanol, for example n-propanol or isopropanol, aromatic solvents, for example benzene, toluene, xylenes, ethers, for example diethyl ether, methyl t-butyl ether, ketones, for example acetone, diesel and mixtures thereof. Examples of basic compounds which can be used according to the invention are aqueous solutions of basic compounds, for example aqueous solutions of alkali metal and/or alkaline earth metal hydroxides, for example KOH, NaOH, aqueous ammonia solutions, aqueous solutions of organic amines of the general formula $R^2_3N$, where the radicals $R^2$ are selected independently from the group consisting of $C_1$-$C_8$-alkyl, optionally substituted by further functional groups. In a preferred embodiment, step (D) is effected by addition of aqueous NaOH solution to a pH of 13. The acidic compounds can be mineral acids, for example HCl, $H_2SO_4$, $HNO_3$ or mixtures thereof, organic acids, for example carboxylic acids. As oxidant, it is possible to use, for example, $Na_2S_2O_4$ or $H_2O_2$, for example as a 30% strength by weight aqueous solution of $H_2O_2$ (Perhydrol).

Examples of surface-active compounds which can be used according to the invention are nonionic, anionic, cationic and/or zwitterionic surfactants.

In a preferred embodiment, the adduct of at least one first material and magnetic particle is dissociated by means of an organic solvent, particularly preferably acetone or diesel. This operation can also be aided mechanically. In a preferred embodiment, ultrasound is used for aiding the dissociation step.

In general, the organic solvent is used in an amount which is sufficient to dissociate virtually all of the adduct. In a preferred embodiment, from 2 to 100 ml of the organic solvent are used per gram of adduct of at least one first material and magnetic particle which is to be dissociated.

According to the invention, the at least one first material and the at least one magnetic particle are present as a dispersion in the dissociation reagent mentioned, preferably an organic solvent, after the dissociation.

The at least one magnetic particle is separated off from the dispersion comprising this at least one magnetic particle and the at least one first material by means of a permanent magnet or electromagnet. Details of this separation are analogous to step (D) of the process of the invention.

The first material to be separated off, preferably the metal compound to be separated off, is preferably separated from the organic solvent by distilling off the organic solvent. The first material which can be obtained in this way can be purified by further processes known to those skilled in the art. The solvent can, if appropriate after purification, be recirculated to the process of the invention.

EXAMPLES

Example 1

100 g of ore (having a content of 0.7% by weight of copper and 0.02% by weight of molybdenum, both sulfides) are milled to a particle size of <125 μm and conditioned in 60 g of water in a vibratory ball mill for 5 minutes using 160 ml of $ZrO_2$ spheres (diameter: 1.7-2.7 mm) after addition of 0.04% by weight of Shellsol® D40 diesel.

In parallel thereto, 3 g of hydrophobicized magnet pigment 345 (hydrophobicized by means of 0.5% by weight of octylphosphonic acid) are slurried in 3 g of isopropanol.

The two mixtures are subsequently conditioned for a further 5 minutes in a vibratory ball mill using 160 ml of $ZrO_2$ spheres (diameter: 1.7-2.7 mm).

The mixture formed is diluted by stirring into 1 l of water. The magnetic constituents are subsequently separated from the nonmagnetic constituents by means of a magnet by holding a Co/Sm magnet against the outer wall of the vessel.

The magnetic residues are dried and analyzed for copper and molybdenum; the magnetic residue comprises 8.7% of copper and 85% of molybdenum, in each case based on the amounts present in the starting mixture.

Example 2

$FeCuS_2/ZnS$

A mixture of 1 g of $FeCuS_2$, 1 g of ZnS and 54 g of $SiO_2$ is treated with 0.04% by weight of Shellsol® D40 diesel and 0.06% by weight of potassium octylxanthate as described in example 1, with the pH being set to about 9.0 by addition of highly dilute NaOH solution, and then separated off magnetically. 2% of zinc but 99% of copper, in each case based on the amounts present in the starting mixture, are found in the magnetic residue.

Example 3

$Cu_2S/FeS_2$

A mixture of 1 g of $FeS_2$, 1 g of $Cu_2S$ and 54 g of $SiO_2$ is treated with 0.04% by weight of Shellsol® D40 diesel and 0.06% by weight of potassium octylxanthate as described in example 1 and then separated off magnetically. 44% of FeS$_2$ but 96% of copper, in each case based on the amounts present in the starting mixture, are found in the magnetic residue.

The invention claimed is:

1. A process for separating at least one first material from a first mixture comprising the at least one first material, at least one second material, and at least one third material, the process comprising:
   (A) contacting the first mixture, comprising at least one first material, at least one second material, and at least one third material, with at least one hydrocarbon in an amount of from 0.012 to 0.4% by weight, based on a sum of the first mixture and the at least one hydrocarbon, to obtain a second mixture;
   (B) optionally, adding at least one dispersion medium to the second mixture obtained in (A), in order to obtain a dispersion;
   (C) treating the second mixture from (A) or the dispersion from (B) with at least one hydrophobic magnetic particle, so that the at least one first material and the at least one magnetic particle agglomerate, to obtain an adduct in a third mixture;
   (D) separating the adduct from (C) from the third mixture by applying a magnetic field;
   (E) optionally, dissociating the adduct which has been separated off in (D), in order to obtain the at least one first material and the at least one magnetic particle separately.

2. The process of claim 1, wherein the at least one first material and the at least one second material are at least one hydrophobic metal compound or coal, and
   wherein the at least one third material is a hydrophobic metal compound.

3. The process of claim 2, wherein the at least one first material comprises coal.

4. The process of claim 2, wherein the at least one first material comprises at least one hydrophobic metal compound.

5. The process of claim 1, wherein the hydrocarbon is at least one selected from the group consisting of a crude oil derivative, a mineral oil, a mineral wax, a vegetable oil, biodiesel, and diesel.

6. The process of claim 1, wherein the at least one hydrocarbon has a flash point of at least 20° C.

7. The process of claim 1, wherein the at least one first material is a sulfidic molybdenum ore, and
   wherein the at least one second material is a sulfidic copper ore.

8. The process of claim 1, wherein the third material is at least one selected from the group consisting of an oxidic metal compound and a hydroxidic metal compound.

9. The process of claim 1, wherein the magnetic particle is at least one selected from the group consisting of a magnetic metal, a ferromagnetic alloy of a magnetic metal, a magnetic iron oxide, a hexagonal ferrite, and a cubic ferrite of formula (III)

$$M^{2+}_xFe^{2+}_{1-x}Fe^{3+}_2O_4 \qquad (III),$$

wherein
M is at least one selected from the group consisting of Co, Ni, Mn, and Zn, and
x is ≤1.

10. The process of claim 1, wherein the dispersion medium in (A) is water.

11. The process of claim 1, wherein the mixture is milled to particles having a size of from 100 nm to 100 μm before or during (A).

12. The process of claim 1, wherein a hydrophobicizing agent is added in (A).

13. The process of claim 1, wherein the contacting is carried out in the absence of a dispersion medium.

14. The process of claim 1, wherein the contacting is carried out in the presence of at least one dispersion medium.

15. The process of claim 1, wherein the hydrocarbon comprises at least one crude oil derivative.

16. The process of claim 1, wherein the hydrocarbon comprises at least one mineral oil.

17. The process of claim 1, wherein the hydrocarbon comprises at least one mineral wax.

18. The process of claim 1, wherein the hydrocarbon comprises at least one vegetable oil.

19. The process of claim 1, wherein the hydrocarbon comprises biodiesel.

20. The process of claim 1, wherein the hydrocarbon comprises diesel.

* * * * *